(12) United States Patent
Varteresian et al.

(10) Patent No.: US 12,603,888 B2
(45) Date of Patent: Apr. 14, 2026

(54) LAYERED AUTHENTICATION METHOD FOR MANAGING ACCESS TO CLOUD RESOURCES

(71) Applicant: Dell Products L.P., Round Rock, TX (US)

(72) Inventors: Michael G. Varteresian, Lexington, MA (US); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 17/568,290

(22) Filed: Jan. 4, 2022

(65) Prior Publication Data

US 2023/0216856 A1     Jul. 6, 2023

(51) Int. Cl.
H04L 9/40 (2022.01)

(52) U.S. Cl.
CPC ............ H04L 63/102 (2013.01); H04L 63/08 (2013.01); *H04L 2463/082* (2013.01)

(58) Field of Classification Search
CPC ..... H04L 63/105; H04L 63/08; H04L 63/102; H04L 2463/082
See application file for complete search history.

(56) References Cited

U.S. PATENT DOCUMENTS

| | | | | |
|---|---|---|---|---|
| 2007/0124803 A1* | 5/2007 | Taraz | ................... | H04L 63/102 726/4 |
| 2007/0143825 A1* | 6/2007 | Goffin | .................. | H04L 63/105 726/2 |
| 2007/0214364 A1* | 9/2007 | Roberts | ................... | G06F 21/31 713/179 |
| 2008/0271117 A1* | 10/2008 | Hamilton | ................ | H04L 63/08 726/3 |
| 2015/0264034 A1* | 9/2015 | Mongillo, III | .......... | H04L 63/08 726/7 |
| 2016/0344736 A1* | 11/2016 | Khait | .................... | H04L 63/102 |
| 2016/0378992 A1* | 12/2016 | Nguyen | ............... | G06F 9/4418 726/19 |
| 2019/0392017 A1* | 12/2019 | Carru | ...................... | H04L 67/02 |
| 2020/0169568 A1* | 5/2020 | Kurian | .................... | H04L 63/08 |
| 2020/0319904 A1* | 10/2020 | Turner | ..................... | G06F 9/54 |
| 2021/0306334 A1* | 9/2021 | Han | ....................... | H04L 63/105 |
| 2022/0014526 A1* | 1/2022 | Burgess | ................ | H04L 63/105 |

* cited by examiner

*Primary Examiner* — Nam T Tran
(74) *Attorney, Agent, or Firm* — Jackson Walker L.L.P.

(57)     ABSTRACT

A disclosed method for managing access to cloud infrastructure include responding to receiving a user request to access a cloud resource, such as a cluster associated with a hyperconverged infrastructure appliance, associated with an entity by performing a layered authentication of the user. The layered authentication includes determining first layer privileges based on first user credentials associated with a first authentication module and determining second layer privileges based on second user credentials associated with a second authentication module. The request is granted or denied based on a combination of the user's first and second layer privileges. The first authentication module may be associated with a first authentication domain such as an authentication domain of a cloud service provider or an OEM of cloud infrastructure resources. The second authentication module may comprise an authentication module maintained by the entity associated with the resource targeted by the user request.

8 Claims, 3 Drawing Sheets

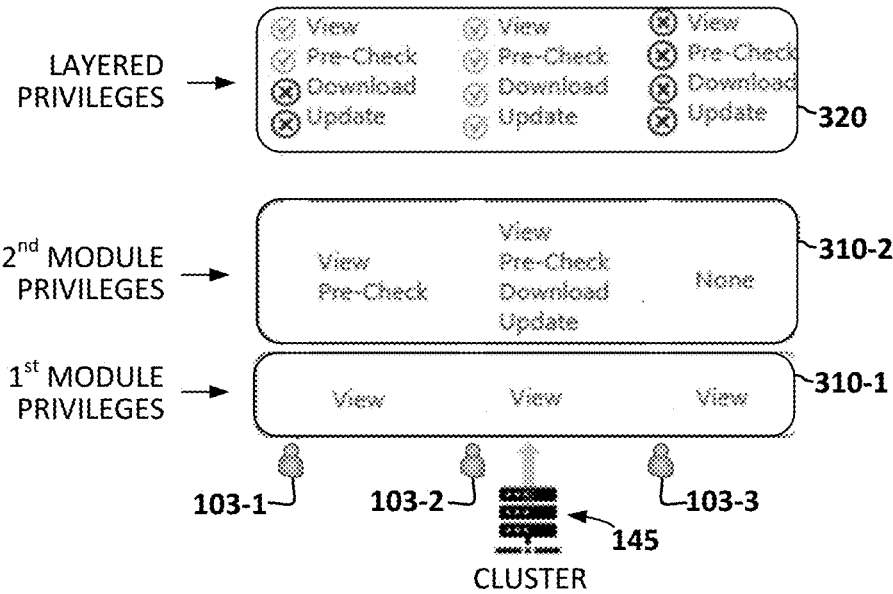

LAYERED PRIVILEGES →

2ⁿᵈ MODULE PRIVILEGES →

1ˢᵗ MODULE PRIVILEGES →

103-1   103-2   145   103-3

CLUSTER

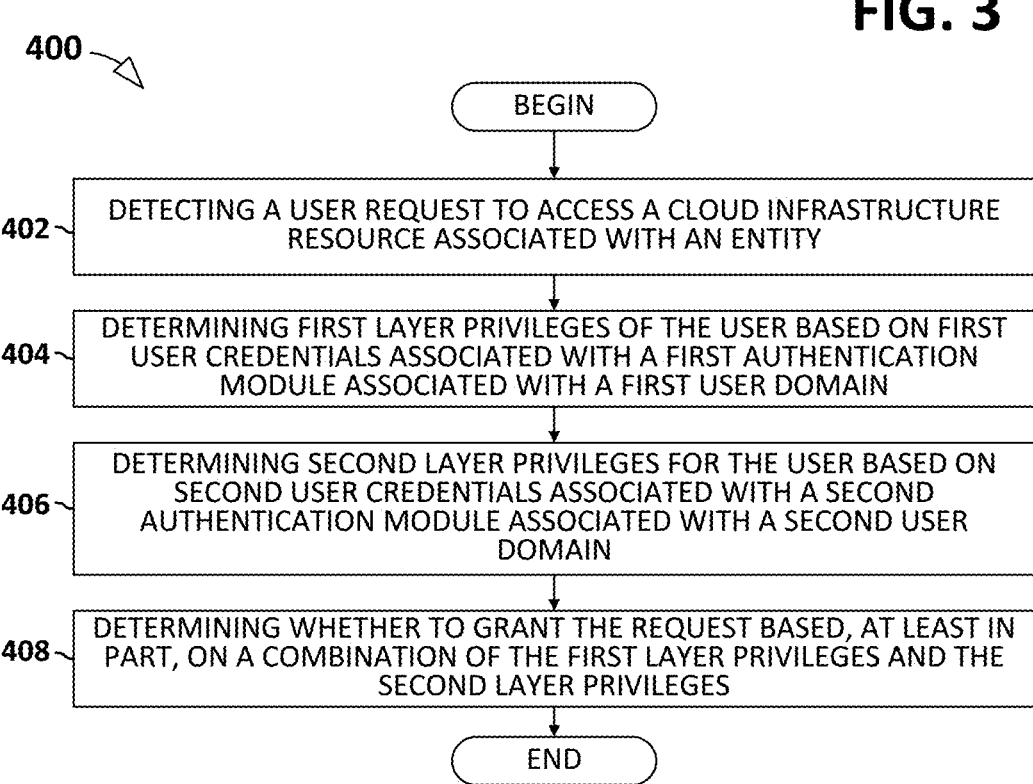

BEGIN

402 — DETECTING A USER REQUEST TO ACCESS A CLOUD INFRASTRUCTURE RESOURCE ASSOCIATED WITH AN ENTITY

404 — DETERMINING FIRST LAYER PRIVILEGES OF THE USER BASED ON FIRST USER CREDENTIALS ASSOCIATED WITH A FIRST AUTHENTICATION MODULE ASSOCIATED WITH A FIRST USER DOMAIN

406 — DETERMINING SECOND LAYER PRIVILEGES FOR THE USER BASED ON SECOND USER CREDENTIALS ASSOCIATED WITH A SECOND AUTHENTICATION MODULE ASSOCIATED WITH A SECOND USER DOMAIN

408 — DETERMINING WHETHER TO GRANT THE REQUEST BASED, AT LEAST IN PART, ON A COMBINATION OF THE FIRST LAYER PRIVILEGES AND THE SECOND LAYER PRIVILEGES

END

501 — CPU(S)    MEMORY — 510

520 — I/O HUB    BMC — 560

540 — NETWORK I/F    I/O DEVICE(S)    STORAGE — 530

550

LAYERED AUTHENTICATION METHOD FOR MANAGING ACCESS TO CLOUD RESOURCES

TECHNICAL FIELD

The present disclosure relates to information handling systems and, more particularly, managing access to cloud based information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Permission to perform actions on cloud based resources via cloud portals might be determined based on a user's identity within an authentication interface or module maintained by the cloud service provider or an OEM of the resource targeted by the request. However, a customer or other entity associated with the targeted resource, may wish to manage permissions and privileges associated with that resource via a customer-specific authentication interface or module.

SUMMARY

Teachings disclosed herein include one or more methods and systems for managing access to cloud infrastructure wherein, responsive to receiving a request to access a cloud resource associated with an entity, a layered authentication of a user associated with the request is performed. The cloud infrastructure resource may include, as a non-limiting example, a cluster associated with a hyper-converged infrastructure appliance.

The layered authentication may include determining first layer privileges of the user based on first user credentials associated with a first authentication module and determining second layer privileges for the user based on second user credentials associated with a second authentication module. The method further includes determining whether to grant the request based, at least in part, on a combination of the user's first and second layer privileges. The first authentication module may be associated with a first authentication domain such as an authentication domain of a cloud service provider or an OEM of cloud infrastructure resources. The second authentication module may comprise an authentication module maintained by the applicable entity, i.e., the entity to which the resource targeted by the user request has been allocation, assigned, or otherwise associated. The user's first credentials and second credentials may be independent and distinct. In some embodiments, the user may only be required to include one set of credentials, e.g., the first credentials, in the user request. In these cases, a layered authentication manager with access to both authentication modules may obtain and provide the user's second credentials to the second authentication module. In some embodiments, both sets of credentials may be included in the user request.

The types of privileges maintained within the first and second layer privileges may include one or more privileges that are common to both layers and one or more privileges that are unique to one of the layers. View privileges, as an example, may be maintained within both layers of privileges and, in at least some implementations, the user request may be denied unless the user has view privileges within both authentication modules. In some implementations, action privileges, indicative of actions the user is authorized to perform on cloud infrastructure resources, are maintained, whether exclusively or non-exclusively, within the second authentication module. The action privileges may include, as examples, download privileges for downloading data from the cloud infrastructure resources, update privileges for taking one or more actions to update the cloud infrastructure resources, and "pre-check" privileges for performing a pre-update health check of the cloud infrastructure privileges.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example of layer authentication modules in accordance with disclosed teachings;

FIG. 4 illustrates a flow diagram of a layered authentication method in accordance with disclosed teachings.

DETAILED DESCRIPTION

Figures 1, 2:
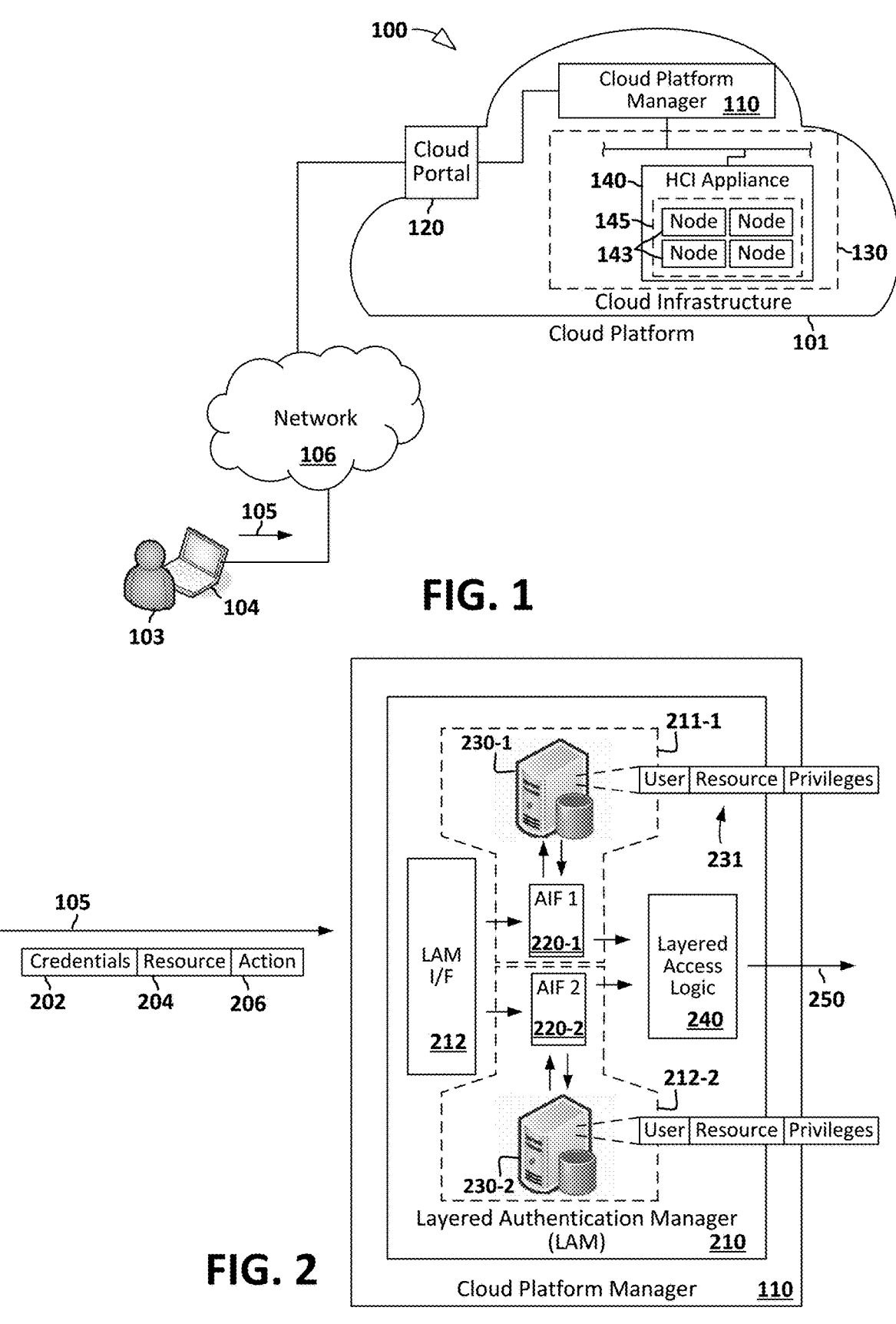
FIG. 1 illustrates a user requesting access to a cloud platform resource.
FIG. 2 illustrates a layered authentication manager in accordance with disclosed teachings.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system 100 and a user 103 interacting with an end user computing device, such as a laptop 104, connected to a public or private network 106, to browse to or otherwise connect with a cloud portal 120 of a cloud platform 101, and to submit an access request identifying, at least in part, a cloud-based resource and one or more actions that the user wishes to take with respect to the resource.

The illustrated cloud platform 101 includes, in addition to cloud portal 120, cloud infrastructure 130 and a cloud platform manager 110. The cloud infrastructure 130 depicted in FIG. 1 may include various types and configurations of information handling components including, as a non-limiting example, the HCI appliance 140 illustrated in FIG. 1. In at least some embodiments, HCI appliance 140 implements a software-centric architecture that supports and tightly integrates virtualized compute, storage, and networking resources. A commercially distributed example suitable for use as the illustrated HCI appliance 140 is any of various VxRail appliances from Dell Technologies.

The illustrated HCI appliance 140 includes four nodes 143 that have been configured as a 4-node cluster 145. Although the illustrated cluster 145 encompasses four nodes 143, other embodiments of cluster 145 may include more or fewer nodes. Cluster 145 supports virtualized information handling resources including, as examples, one or more virtual machines and/or one or more containerized resources. For the sake of clarity, FIG. 1 omits virtualized resources associated with cluster 145.

Cluster 145 may be entirely or partially allocated to or otherwise associated with an entity such as a corporate, governmental, or educational entity. For purposes of the following description of layered authentication, it is stipulated that cluster 145 is entirely allocated to or associated with the entity and that user request 105 includes a request to access at least some part of cluster 145. For example, user request 105 may include a request to view and, optionally, updating or taking some other action pertaining to cluster 145. Because user 103 may or may not be an employee or agent of the entity and because user 103 may or may not be authorized to access cluster 145, some form of authentication is necessary. In some cases, there may be two or more authentication modules associated with cluster 145. For example, a cloud service provider or a component vendor, e.g., an OEM of the HCI appliance, may provide a first authentication platform that encompasses, not only cluster 145 and the corresponding entity, but also other resources and other entities. A second authentication platform pertaining to cluster 145 may be an entity-specific module. To illustrate for a case in which HCI appliance 140 is a VxRail appliance from Dell Technologies, permission to perform actions on VxRail resources via cloud portals may be based, at least in part, on the user's identity in a Dell single sign on (SSO) system that encompasses a domain of users that includes extends beyond the entity associated with cluster 145. In addition, however, the entity may wish to control permissions based on entity-specific credentials and security provided, for example, by on-premises server management software such as VMware vCenter SSO. Layered authentication teachings disclosed herein address such situations.

FIG. 2 illustrates an implementation of cloud platform manager 110 in accordance with disclosed teachings for layered authentication. The cloud platform manager 110 illustrated in FIG. 2 includes a layered authentication manager (LAM) 210 configured to coordinate two distinct authentication modules 211, illustrated as a first authentication module 211-1 and a second authentication module 211-2, for granting access to information handling resources including, in the illustrated example, cluster 145. Each authentication module 211 includes a corresponding authentication interface (AIF) 220 and an authentication database server 230. Each authentication module 211 may be associated with a corresponding user domain. For example, the first authentication module 211-1 may be associated with a user domain maintained by the cloud service provider or a manufacturer or distributer of the cloud infrastructure while the second domain may be associated with a user domain corresponding to the entity associated with cluster 145.

The LAM 210 illustrated in FIG. 2 includes a LAM interface 212 configured to receive user request 105 and to communicate with AIF 1 220-1 and AIF 2 220-2. The user request 105 shown in FIG. 2 includes credential information 202 indicative of an identity of user 103, resource information 204, indicative of the resource targeted by user request 105, i.e., the resource user 103 would like to access, and action information 206 indicative of an action, command, or procedure to be performed on the targeted resource. Although FIG. 2 represents user request 105 as a single data structure, those of ordinary skill in the field of distributed computing systems and messages will readily appreciate that, in at least some embodiments including RESTful embodiments, the credential, resource, and action information illustrated in FIG. 2 may be conveyed in one or more packets, datagrams, or the like, each of which may be embedded in one or more layers of packet headers.

Each of the illustrated AIFs 220 is communicatively coupled to the corresponding authentication database server 230. Each of the illustrated authentication database servers 230 has access to a database of records indicating authorized users and their corresponding credentials, e.g., userID, password, biometric data, or the like, as well as the managed resources the user is authorized to access and the privileges, including the actions or commands the user is authorized to perform or execute for each resource.

Upon receiving user request 105 from cloud portal 120, LAM interface 212 extracts credentials information 202 and resource information 204 from user request 105. The credentials information 202 and resource information 204 are provided to one or both AIFs 220 to invoke AIFs 220 to query the corresponding authentication database servers 230 and thereby retrieve one or more records 231, one of which is illustrated in FIG. 3. The records 231 depicted in FIG. 2, which may be referred to herein as user privilege records 231 indicate the privileges a user has with respect to a particular resource.

In some embodiments, the credentials information 202 in user request 105 includes separate and distinct credentials for each authentication module 211. In these embodiments, LAM interface 220 may segregate the credentials for each module and forward the appropriate credentials to each AIF 220. In other embodiments, user request 105 may include one but not both sets of credentials. In these embodiments, LAM interface 212 may be configured to obtain credentials for the other authentication module based on the credentials that are provided in user request 105. In one such embodiment, LAM interface 212 may maintain records mapping each user's credentials for the first authentication module 211-1 the users credentials for the second authentication module 211-2. In another embodiment, the mapping of a user's two sets of credentials may be embedded within one of the authentication database servers 230.

The illustrated AIFs 220, upon receiving credential and resource information from LAM interface 212, query the corresponding database server to determine the user's privileges, if any, with respect to the targeted resource. AIFs 220 may then provide the privileges information to layered access logic 240.

Layered access logic 240, which may be implemented in hardware, software, or a combination thereof, processes the privileges information received from AIFs 220 and generates a request grant signal 250, indicative of whether the user's requested access to the targeted resource has been granted, based at least in part on a combination of the user's privileges in the first and second authentication modules.

Each authentication module may maintain privilege information for a number of different privilege parameters corresponding to actions a user may perform on a targeted resource. Non-limiting examples of privileges might include view privileges, download privileges, update privileges, and "pre-check" privileges indicative of the authority to perform pre-update health checks. In some embodiments, the privilege parameters may include a primary privilege parameter, such as a view privilege, that is a perquisite to other privileges. In some such embodiments, layered access logic may deny access to a user who does not have the primary privilege within both authentication modules.

To resolve conflicts that might arise when the privilege information for a particular privilege parameter differs between the two authentication modules, layered access logic 240 may be configurable to specify which of the authentication modules has priority over any given privilege parameter. In addition, some embodiments may be configured wherein a conflict involving a primary parameter is always resolved in favor of either denying access or granting access. If, as in the previous example, a view privilege is designated as a primary privilege and the two authentication modules contain conflicting view privilege information for a specific user and resource, layered access logic 240 may be configured to specify whether to grant or deny view access to the user.

FIG. 3 illustrates a layered authentication example for three users 103-1, 103-2, and 103-3, and four privilege parameters (view, pre-check, download, and update) in accordance with disclosed layered authentication teachings. The first module privileges 310-1 illustrated in FIG. 3 indicate the access privileges of each user 103, with respect to cluster 145, within the first authentication module. Similarly, second module privileges 310-2 indicate the access privileges of each user 103, with respect to cluster 145, within the second authentication module. In the illustrated example, first module privileges 310-1 convey that each user 103 has view privileges within the first authentication module. Second module privileges 310-2 convey that, within the second authentication module, first user 103-1 has view and pre-check privileges, second user 103-2 has view, pre-check, download, and update privileges, and third user 103-3 has no access privileges with respect to cluster 145. In the illustrated example, layered access logic 240 has been configured such that the resulting layered privileges 320 granted to each user 103 with respect to cluster 145 include view and pre-check privileges for first user 103-1, view, pre-check, download, and update privileges for second user 103-2, and no privileges for third user 103-3.

The layered privileges 320 may reflect an implementation of layer access logic 240 in which (1) the view privilege is a primary privilege, (2) the view privilege is the only privilege maintained within the first authentication module, and/or (3) users must have view privilege authority within both authentication modules as a prerequisite to all other privileges. It will, however, be appreciated by those of ordinary skill in the field that other implementations, not represented in FIG. 3, corresponding to one or more different rules or policies implemented by layered access logic 240. As one non-limiting example, a different implementation of layered access logic 240 could treat the primary privilege, such as the view privilege in FIG. 3, as a logical OR case, meaning that view access within either authentication module is sufficient. As another example, both authentication modules could maintain data for each of the applicable privileges, in which case, the resulting privileges could be determined based upon whether the user has the applicable privilege within both authentication modules, i.e., a logical AND policy, or whether the user has the privilege within either authentication module, a logical OR policy. In some cases, layered authentication logic 240 may be configurable wherein a logical AND policy is applied to one or more privileges while a logical OR policy is applied to one or more other privileges. Again, however, these examples are not intended to be exhaustive and other policies for determining the layered privileges 320 are encompassed by teachings disclosed herein.

FIG. 4 illustrates a flow chart for a layered authentication method 400 in accordance with disclosed teachings. In at least some embodiments, method 400 may be performed by the LAM 210 illustrated in FIG. 2. The illustrated method 400 includes detecting (operation 402) a user request to access a cloud infrastructure resource associated with an entity, which may be a business, an educational institution, a government agency, or the like. Upon detecting the user request, first layer privileges of the user are determined (operation 404) based on first user credentials provided to a first authentication module, which may associated with a first user domain such as a user domain associated with a cloud service provider or a user domain associated with an OEM of the cloud infrastructure. The illustrated method 400 then determines (operation 406) second layer privileges for the user based on second user credentials associated with a second authentication module, wherein the second user domain may refer to a user domain associated with the entity. A grant/deny determination, indicative of whether the user request is granted or denied is then made (operation 408) based, at least in part, on a combination of the first layer privileges and the second layer privileges.

Figure 5:
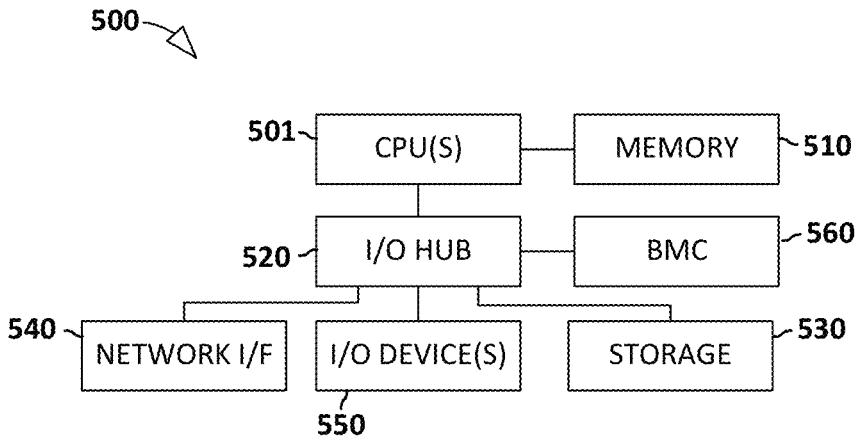
FIG. 5 illustrates an exemplary information handling system.

Referring now to FIG. 5, any one or more of the components illustrated in FIG. 1 and FIG. 2 may implanted as or within an information handling system exemplified by the information handling system 500 illustrated in FIG. 3. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 3 include a network interface 540, commonly referred to as a NIC (network interface card), storage resources 530, and additional I/O devices, components, or resources including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing access to cloud infrastructure, the method comprising:

responsive to receiving a request to access a cloud infrastructure resource provisioned by a cloud service provider and allocated, by the cloud service provider, to an entity, performing a layered authentication of a user associated with the request, wherein the layered authentication includes:

determining first layer privileges of the user based on first user credentials associated with a first authentication interface, wherein the first authentication interface comprises an authentication interface of the cloud service provider;

determining second layer privileges for the user based on second user credentials associated with a second authentication interface, wherein the second authentication interface comprises an authentication interface of the entity;

wherein the first and second layer privileges include one or more privileges common to both the first and the second layer privileges and one or more privileges unique to the second layer of privileges; and determining whether to grant the request based, at least in part, on a combination of the first layer privileges and the second layer privileges;

wherein the first layer privileges determine whether the cloud service provider permits the user to view the cloud infrastructure resource, the second layer privileges determine actions the entity permits the user to perform on the cloud infrastructure resource, and the actions include updating the cloud infrastructure resource;

wherein the first credentials and the second credentials are independent and distinct.

2. The method of claim 1, wherein the cloud infrastructure resource includes a multi-node cluster provisioned by a hyper-converged infrastructure appliance.

3. The method of claim 1, wherein the user request contains only one of the first credentials and the second credentials.

4. The method of claim 1, wherein determining whether to grant the request includes denying the request unless the cloud service provider and the entity both permit the user to view the cloud infrastructure resource.

5. An information handling system, comprising:

a central processing unit; and a memory including process executable instructions that, when executed by the central processing unit, cause the system to perform operations for managing access to cloud infrastructure, the operations comprising:

responsive to receiving a request to access a cloud infrastructure resource provisioned by a cloud service provider and allocated, by the cloud service provider, to an entity, performing a layered authentication of a user associated with the request, wherein the layered authentication includes:

determining first layer privileges of the user based on first user credentials associated with a first authentication interface, wherein the first authentication interface comprises an authentication interface of the cloud service provider;

determining second layer privileges for the user based on second user credentials associated with a second authentication interface, wherein the second authentication interface comprises an authentication interface of the entity;

wherein the first and second layer privileges include one or more privileges common to both the first and the second layer privileges and one or more privileges unique to of the second layer of privileges; and determining whether to grant the request based, at least in part, on a combination of the first layer privileges and the second layer privileges;

wherein the first layer privileges determine whether the cloud service provider permits the user to view the cloud infrastructure resource, the second layer privileges determine actions the entity permits the user to perform on the cloud infrastructure resource, and the actions include performing a pre-update health check of the cloud infrastructure resource;

wherein the first credentials and the second credentials are independent and distinct.

6. The information handling system of claim 5, wherein the cloud infrastructure resource includes a multi-node cluster provisioned by a hyper-converged infrastructure appliance.

7. The information handling system of claim 5, wherein the user request contains only one of the first credentials and the second credentials.

8. The information handling system of claim 5, wherein determining whether to grant the request includes denying the request unless the cloud service provider and the entity both permit the user to view the cloud infrastructure resource.

* * * * *